United States Patent
Johnston

(10) Patent No.: US 10,657,657 B2
(45) Date of Patent: May 19, 2020

(54) METHOD, SYSTEM AND APPARATUS FOR DETECTING A CHANGE IN ANGULAR POSITION OF A CAMERA

(71) Applicant: CANON KABUSHIKI KAISHA, Tokyo (JP)

(72) Inventor: David Ian Johnston, Leichhardt (AU)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 15/952,766

(22) Filed: Apr. 13, 2018

(65) Prior Publication Data

US 2018/0308241 A1    Oct. 25, 2018

(30) Foreign Application Priority Data

Apr. 19, 2017    (AU) ................... 2017202584

(51) Int. Cl.
| | |
|---|---|
| *G06K 9/00* | (2006.01) |
| *G03B 13/00* | (2006.01) |
| *G06T 7/246* | (2017.01) |
| *G06K 9/62* | (2006.01) |
| *H04N 5/232* | (2006.01) |
| *H04N 101/00* | (2006.01) |

(52) U.S. Cl.
CPC .......... *G06T 7/248* (2017.01); *G06K 9/00718* (2013.01); *G06K 9/6215* (2013.01); *H04N 5/232* (2013.01); *H04N 5/23258* (2013.01); *H04N 5/23261* (2013.01); *H04N 5/23299* (2018.08); *G06T 2207/10016* (2013.01); *G06T 2207/30244* (2013.01); *H04N 2101/00* (2013.01)

(58) Field of Classification Search
USPC ................ 382/100, 103, 106–107, 154, 162, 382/167–168, 172, 173, 181, 199, 219, 382/224, 232, 254, 274, 276, 286, 291, 382/305, 236, 312; 396/104; 375/240.16; 348/142; 463/30
See application file for complete search history.

(56) References Cited

U.S. PATENT DOCUMENTS 6,081,668 A * 6/2000 Furuyama ................ G02B 7/28
396/104
8,574,073 B2 * 11/2013 Musa ..................... A63F 13/428
463/30

(Continued)

*Primary Examiner* — Seyed H Azarian
(74) *Attorney, Agent, or Firm* — Canon U.S.A., Inc. IP Division

(57) ABSTRACT

A method of detecting a change in angular position of a camera. A plurality of frames captured by the camera is received, each frame being associated with brightness and acceleration metadata. The brightness metadata is associated with a frame being representative of brightness of a scene captured by the frame. A contiguous set of candidate panning motion frames is selected from the plurality of frames, based on similarity of acceleration characteristics, to determine a change of brightness metadata in the selected contiguous set of frames. An angular movement score is determined for the selected contiguous set of frames using the change of brightness metadata. A change in the angular position of the camera is detected based on the angular movement score to adjust a manner in which the plurality of frames is displayed by a display device coupled with the camera.

20 Claims, 9 Drawing Sheets

(56) References Cited

U.S. PATENT DOCUMENTS

| | | | | |
|---|---|---|---|---|
| 8,780,214 B2* | 7/2014 | Ishii | .................... | H04N 1/00323 |
| | | | | 348/142 |
| 8,872,927 B2 | 10/2014 | Proca et al. | | |
| 2015/0256846 A1* | 9/2015 | Hattori | .................... | H04N 19/46 |
| | | | | 375/240.16 |
| 2016/0057445 A1* | 2/2016 | Tsubaki | ............... | H04N 19/521 |
| | | | | 382/236 |

* cited by examiner

METHOD, SYSTEM AND APPARATUS FOR DETECTING A CHANGE IN ANGULAR POSITION OF A CAMERA

REFERENCE TO RELATED PATENT APPLICATION(S)

This application claims the benefit under 35 U.S.C. § 119 of the filing date of Australian Patent Application No. 2017202584, filed Apr. 19, 2017, hereby incorporated by reference in its entirety as if fully set forth herein.

TECHNICAL FIELD

The present disclosure relates generally to digital video metadata processing and, in particular, to a method, system and apparatus for detecting a change in angular position of a camera. The present invention also relates to a computer program product including a computer readable medium having recorded thereon a computer program for detecting a change in angular position of a camera.

BACKGROUND

Video is an effective way to capture a scene or an unfolding event. People often capture video sequences for birthday parties, weddings, travel events and sports events. Unlike still images, video sequences have the advantage of capturing evolving, unstructured events, such as particular natural facial expressions and human interactions (e.g. talking, mutual smiling, kissing, hugging, handshakes). It is often desirable to select segments of a video sequence to generate a shorter version of the video sequence which contains the highlight sections. It is also desirable to remove dull, repetitive or poor quality sections of the video sequence. It is also desirable to select video highlights automatically.

One method of automatically selecting video highlights is to post-process a video sequence on a personal computer. This has the advantage that considerable processing power is available, so that techniques which use image analysis of the individual frames of the video sequence are possible. It is also possible to use additional video metadata that a camera may capture and record along with the video (such as data from gyro sensors, face detection hardware and exposure sensors). However, standard video formats do not include such additional video metadata, so proprietary video formats may be required to exchange data between the camera and a PC.

SUMMARY

It is an object of the present invention to substantially overcome, or at least ameliorate, one or more disadvantages of existing arrangements.

According to one aspect of the present disclosure, there is provided a method of detecting a change in angular position of a camera, the method comprising:

receiving a plurality of frames captured by the camera, each frame being associated with brightness and acceleration metadata, the brightness metadata associated with a frame being representative of brightness of a scene captured by the frame;

selecting a contiguous set of candidate panning motion frames from the plurality of frames, based on similarity of acceleration characteristics, to determine a change of brightness metadata in the selected contiguous set of frames;

determining an angular movement score for the selected contiguous set of frames using the change of brightness metadata; and detecting a change in the angular position of the camera based on the angular movement score to adjust a manner in which the plurality of frames is displayed by a display device coupled with the camera.

According to another aspect of the present disclosure, there is provided a system for detecting a change in angular position of the camera, the system comprising:

a memory for storing data and a computer program;

a processor coupled to the memory for executing the computer program, the computer program comprising instructions for:

receiving a plurality of frames captured by the camera, each frame being associated with brightness and acceleration metadata, the brightness metadata associated with a frame being representative of brightness of a scene captured by the frame;

selecting a contiguous set of candidate panning motion frames from the plurality of frames, based on similarity of acceleration characteristics, to determine a change of brightness metadata in the selected contiguous set of frames;

determining an angular movement score for the selected contiguous set of frames using the change of brightness metadata; and detecting a change in the angular position of the camera based on the angular movement score to adjust a manner in which the plurality of frames is displayed by a display device coupled with the camera.

According to still another aspect of the present disclosure, there is provided an apparatus for detecting a change in angular position of a camera, the apparatus comprising:

means for receiving a plurality of frames captured by the camera, each frame being associated with brightness and acceleration metadata, the brightness metadata associated with a frame being representative of brightness of a scene captured by the frame;

means for selecting a contiguous set of candidate panning motion frames from the plurality of frames, based on similarity of acceleration characteristics, to determine a change of brightness metadata in the selected contiguous set of frames;

means for determining an angular movement score for the selected contiguous set of frames using the change of brightness metadata; and means for detecting a change in the angular position of the camera based on the angular movement score to adjust a manner in which the plurality of frames is displayed by a display device coupled with the camera.

According to still another aspect of the present disclosure, there is provided a computer readable medium having a computer program stored thereon for detecting a change in angular position of a camera, the program comprising:

code for receiving a plurality of frames captured by the camera, each frame being associated with brightness and acceleration metadata, the brightness metadata associated with a frame being representative of brightness of a scene captured by the frame;

code for selecting a contiguous set of candidate panning motion frames from the plurality of frames, based on similarity of acceleration characteristics, to determine a change of brightness metadata in the selected contiguous set of frames;

code for determining an angular movement score for the selected contiguous set of frames using the change of brightness metadata; and code for detecting a change in the angular position of the camera based on the angular movement score to adjust a manner in which the plurality of frames is displayed by a display device coupled with the camera.

According to still another aspect of the present disclosure, there is provided a system configured within a camera for detecting a change in angular position of the camera, the system comprising:

a memory for storing data and a computer program;

a processor coupled to the memory for executing the computer program, the computer program comprising instructions for:

receiving a plurality of frames captured by the camera, each frame being associated with brightness and acceleration metadata, the brightness metadata associated with a frame being representative of brightness of a scene captured by the frame;

selecting a contiguous set of candidate panning motion frames from the plurality of frames, based on similarity of acceleration characteristics, to determine a change of brightness metadata in the selected contiguous set of frames;

determining an angular movement score for the selected contiguous set of frames using the change of brightness metadata; and detecting a change in the angular position of the camera based on the angular movement score to adjust a manner in which the plurality of frames is displayed by a display device coupled with the camera.

According to still another aspect of the present disclosure, there is provided a camera comprising:

a memory for storing data and a computer program;

a processor coupled to the memory for executing the computer program, the computer program comprising instructions for:

receiving a plurality of frames captured by the camera, each frame being associated with brightness and acceleration metadata, the brightness metadata associated with a frame being representative of brightness of a scene captured by the frame;

selecting a contiguous set of candidate panning motion frames from the plurality of frames, based on similarity of acceleration characteristics, to determine a change of brightness metadata in the selected contiguous set of frames;

determining an angular movement score for the selected contiguous set of frames using the change of brightness metadata; and detecting a change in the angular position of the camera based on the angular movement score to adjust a manner in which the plurality of frames is displayed by a display device coupled with the camera.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
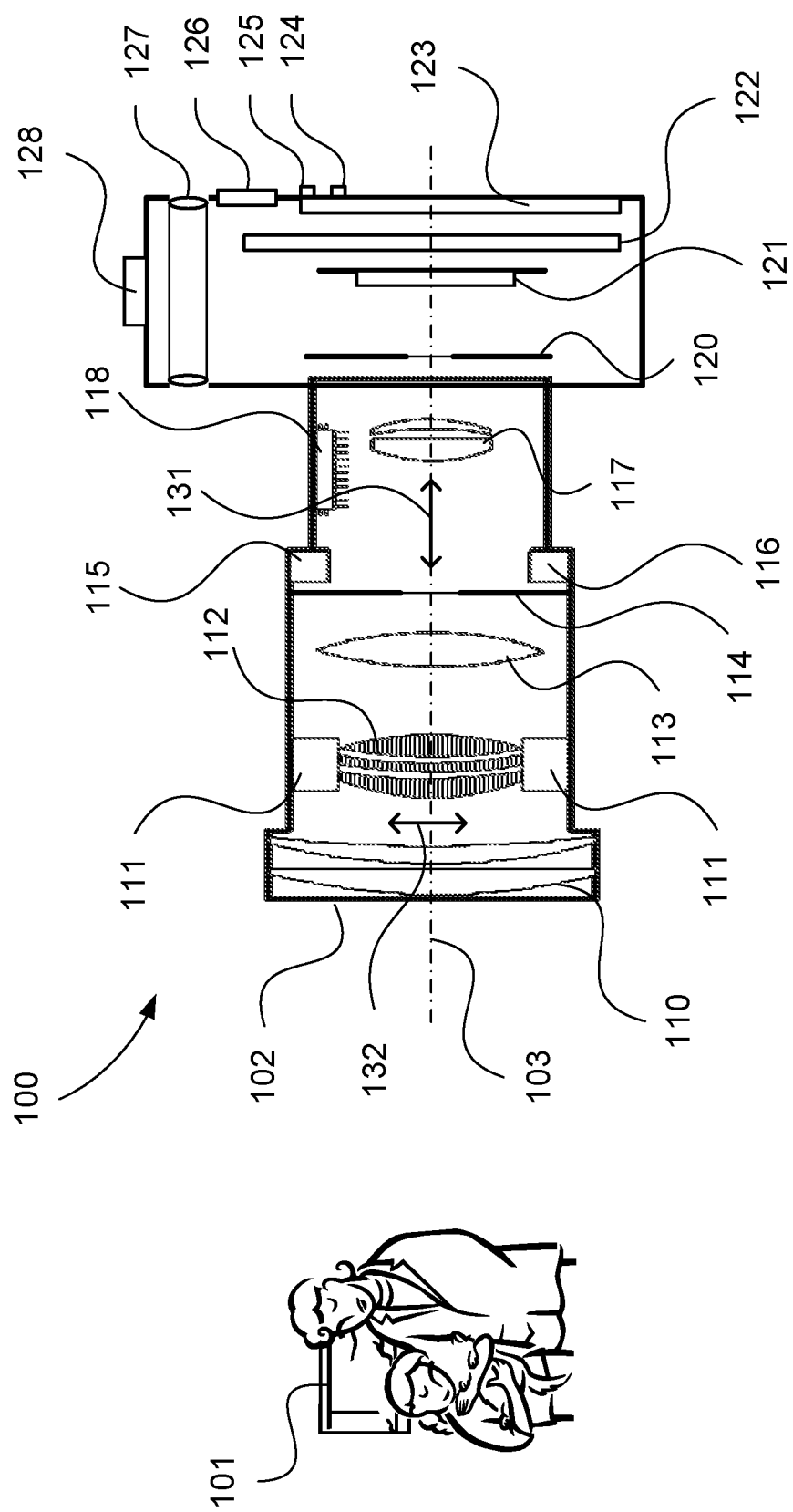
FIG. 1A is a diagram of an image capture system capable of shooting both still images and video sequences.

Where reference is made in any one or more of the accompanying drawings to steps and/or features, which have the same reference numerals, those steps and/or features have for the purposes of this description the same function(s) or operation(s), unless the contrary intention appears.

FIG. 1A is a cross-section diagram of an example image capture system 100, upon which the various arrangements described can be practiced. In the general case, the image capture system 100 may be a digital still camera or a digital video camera (also referred to as a camcorder). The image capture system 100 will be referred to below as the "camera system 100" or the "camera 100".

As seen in FIG. 1A, the camera system 100 comprises an optical system 102 which receives light from a scene 101 and forms an image on a sensor 121. The sensor 121 comprises a 2D array of pixel sensors which measure the intensity of the image formed on it by the optical system as a function of position. The operation of the camera 100, including user interaction and all aspect of reading, processing and storing image data from the sensor 121 is coordinated by a main controller 122 which comprises a special purpose computer system. The system 100 is considered in detail below. The user is able to communicate with the controller 122 via a set of buttons including a shutter release button 128, used to initiate focus and capture of image data, and other general and special purpose buttons 124, 125, 126 which may provide direct control over specific camera functions such as flash operation or support interaction with a graphical user interface presented on a display device 123. The display device 123 may also have a touch screen capability to further facilitate user interaction. Using the buttons and controls it is possible to control or modify the behaviour of the camera 100. Typically it is possible to control capture settings such as the priority of shutter speed or aperture size when achieving a required exposure level, or the area used for light metering, use of flash, ISO speed, options for automatic focusing and many other photographic control functions. Further, it is possible to control processing options such as the colour balance or compression quality. The display 123 is typically also used to review the captured image or video data. It is common for a still image camera to use the display 123 to provide a live preview of the scene, thereby providing an alternative to an optical viewfinder 127 for composing prior to still image capture and during video capture.

The optical system 102 comprises an arrangement of lens groups 110, 112, 113 and 117 which can be moved relative to each other along a line 131 parallel to an optical axis 103 under control of a lens controller 118 to achieve a range of magnification levels and focus distances for the image formed at the sensor 121. The lens controller 118 may also control a mechanism 111 to vary the position, on any line 132 in the plane perpendicular to the optical axis 103, of a corrective lens group 112, in response to input from one or more motion sensors 115, 116 or the controller 122 so as to shift the position of the image formed by the optical system 102 on the sensor 121. Typically, the corrective optical element 112 is used to effect an optical image stabilisation by correcting the image position on the sensor 121 for small movements of the camera 100 such as those caused by hand-shake. The optical system 102 may further comprise an adjustable aperture 114 and a shutter mechanism 120 for restricting the passage of light through the optical system 102. Although both the aperture and shutter are typically implemented as mechanical devices they may also be constructed using materials, such as liquid crystal, whose optical properties can be modified under the control of an electrical control signal. Such electro-optical devices have the advantage of allowing both shape and the opacity of the aperture to be varied continuously under control of the controller 122.

Figure 1B:
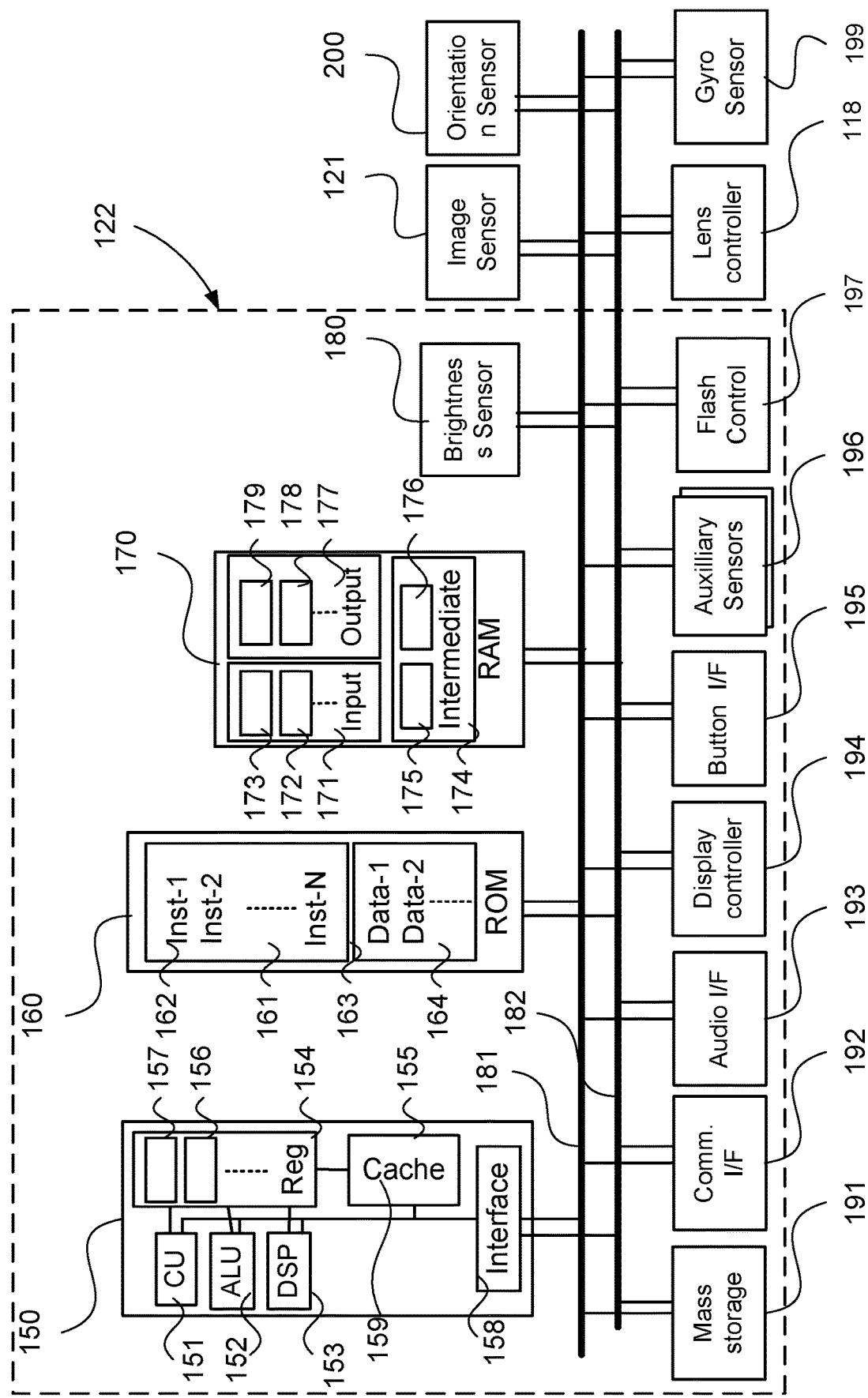
FIG. 1B is a schematic block diagram of a controller of the image capture system of FIG. 1A.

FIG. 1B is a schematic block diagram of the controller 122 of FIG. 1B, in which other components of the camera system 100 which communicate with the controller 122 are depicted as functional blocks. In particular, the image sensor 121, lens controller 118 and gyro sensor 199 are depicted without reference to their physical organisation or the image forming process and are treated only as devices which perform specific pre-defined tasks and to which data and control signals can be passed.

FIG. 1B also depicts a flash controller 197 which is responsible for operation of a strobe light that can be used during image capture in low light. Auxiliary sensors 196 may include orientation sensors that detect if the camera 100 is in a landscape of portrait orientation during image capture; other sensors that detect the colour of the ambient illumination or assist with autofocus and so on. Although the auxiliary sensors 196 are depicted as part of the controller 122, the auxiliary sensors 196 may in some implementations be implemented as separate components within the camera system 100. The gyro sensor 199 detects angular motion of the camera 100. The gyro sensor 199 may report angular motion in pitch and yaw. The gyro sensor 199 may form part of sensors 115 and/or 116 as shown on FIG. 1A, or the gyro sensor 199 may be a separate sensor. The orientation sensor 200 detects the angular position of the camera 100 in the roll axis. The orientation sensor 200 information may be derived from the gyro sensor 199, or the orientation sensor 200 may be a separate sensor. The orientation sensor may report the camera orientation in ninety (90) degree increments.

The controller 122 comprises a processing unit (or processor) 150 for executing program code, Read Only Memory (ROM) 160 and Random Access Memory (RAM) 170 as well as non-volatile mass data storage 191. The controller 122 may also comprise a dedicated brightness module 180. In addition, at least one communications interface (I/F) 192 is provided for communication with other electronic devices such as printers, displays and general purpose computers. Examples of communication interfaces include USB, IEEE1394, HDMI and Ethernet. An audio interface 193 comprises one or more microphones and speakers for capture and playback of digital audio data. A display controller 194 and button interface 195 are also provided to interface the controller 122 to the display 123 and controls present on a body of the camera 100. The components of the camera 122 are interconnected by a data bus 181 and control bus 182.

In a capture mode, the controller 122 operates to read data from the image sensor 121 and audio interface 193 and manipulate that data to form a digital representation of the scene that can be stored to a non-volatile mass data storage 191. In the case of a still image camera, image data may be stored using a standard image file format such as JPEG or TIFF, or the image data may be encoded using a proprietary raw data format that is designed for use with a complimentary software product that would provide conversion of the raw format data into a standard image file format. Such software would typically be run on a general purpose computer. For a video camera, the sequences of images that comprise the captured video are stored using a standard format such DV, MPEG, H.264. Some of these standard formats are organised into files such as AVI or Quicktime referred to as container files, while other formats such as DV, which are commonly used with tape storage, are written as a data stream. The non-volatile mass data storage 191 is used to store the image or video data captured by the camera system 100 and has a large number of realisations including but not limited to removable flash memory such as a compact flash (CF) or secure digital (SD) card, memory stick, multimedia card, miniSD or microSD card; optical storage media such as writable CD, DVD or Blu-ray disk; or magnetic media such as magnetic tape or hard disk drive (HDD) including very small form-factor HDDs such as microdrives. The choice of mass storage depends on the capacity, speed, usability, power and physical size requirements of the particular camera system 100.

Scene brightness information is provided by the brightness module 180. The brightness module 180 may take information from the image sensor 190 or the brightness module 190 may be a separate sensor. The brightness module 190 is configured to determine the correct exposure when capturing video sequences or still images. The brightness module 180 typically records a single brightness value which represents the scene brightness, often determined as defined by the photography industry standard APEX system. The brightness value may be stored as metadata alongside the captured still image or video sequence. Camera motion information from the gyro sensor 199 and orientation information from the orientation sensor 200, if the gyro sensor 199 and orientation sensor 200 are used in the camera system 100, may also be stored alongside the still image or video sequence as metadata. Furthermore, the current focal length setting of the camera obtained from the lens controller module 118 may be stored as metadata alongside the other metadata. When a video sequence is being captured, the metadata is associated with frames in the video sequence. Thus, for each frame in the video sequence there will be scene brightness information, camera motion information and possibly focal length information stored in the metadata which is particular to that frame.

In a playback or preview mode, the controller 122 operates to read data from the mass storage 191 and present that data using the display 194 and audio interface 193.

The processor 150 is able to execute programs stored in one or both of the connected memories 160 and 170. When the camera system 100 is initially powered up, system program code 161, resident in ROM memory 160, is executed. The system program permanently stored in the ROM 160 is sometimes referred to as firmware. Execution of the firmware by the processor 150 fulfils various high level functions, including processor management, memory management, device management, storage management and user interface.

The system program code 161 may be stored in a computer readable medium, including the storage devices described below, for example. The system program code 161 is loaded into the system 100 from the computer readable medium, and then executed by the system 100. A computer readable medium having such software or computer program recorded on the computer readable medium is a computer program product.

In some instances, the system program code 161 may be supplied to the user encoded on one or more CD-ROMs and read via a corresponding drive, or alternatively may be read by the user from a network. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the system 100. Examples of transitory or non-tangible computer readable transmission media that may also participate in the provision of software, application programs, instructions and/or data to the system 100 include radio or infra-red transmission channels as well as a network connection to another computer or networked device, and the Internet or Intranets including e-mail transmissions and information recorded on Websites and the like. The processor 150 includes a number of functional modules including a control unit (CU) 151, an arithmetic logic unit (ALU) 152, a digital signal processing engine (DSP) 153 and a local or internal memory comprising a set of registers 154 which typically contain atomic data elements 156, 157, along with internal buffer or cache memory 155. One or more internal buses 159 interconnect these functional modules. The processor 150 typically also has one or more interfaces 158 for communicating with external devices via the system data 181 and control 182 buses.

The system program 161 includes a sequence of instructions 162 through 163 that may include conditional branch and loop instructions. The program 161 may also include data which is used in execution of the program 161. The data used in execution of the program 161 may be stored as part of the instruction or in a separate location 164 within the ROM 160 or RAM 170.

In general, the processor 150 is given a set of instructions which are executed therein. The set of instructions given to the processor 150 may be organised into blocks which perform specific tasks or handle specific events that occur in the camera system 100. Typically the system program 161 will wait for events and subsequently execute the block of code associated with that event. The execution of a block of code associated with an event may involve setting into operation separate threads of execution running on independent processors in the camera system 100, such as the lens controller 197 that will subsequently execute in parallel with the program running on the processor 150. Events may be triggered in response to input from a user as detected by the button interface 195. Events may also be triggered in response to other sensors and interfaces in the camera system 100.

The execution of a set of the instructions may require numeric variables to be read and modified. Such numeric variables are stored in RAM 170. Methods disclosed below may use input variables 171 that are stored in known locations 172, 173 in the memory 170. The input variables are processed to produce output variables 177, that are stored in known locations 178, 179 in the memory 170. Intermediate variables 174 may be stored in additional memory locations in locations 175, 176 of the memory 170. Alternatively, some intermediate variables may only exist in the registers 154 of the processor 150.

The execution of a sequence of instructions is achieved in the processor 150 by repeated application of a fetch-execute cycle. The control unit 151 of the processor 150 maintains a register called the program counter which contains the address in memory 160 of the next instruction to be executed. At the start of the fetch execute cycle, the contents of the memory address indexed by the program counter is loaded into the control unit 151. The instruction thus loaded controls the subsequent operation of the processor 150, causing for example, data to be loaded from memory 170 into processor registers, the contents of a register to be arithmetically combined with the contents of another register, the contents of a register to be written to the location stored in another register and so on. At the end of the fetch execute cycle the program counter is updated to point to the next instruction in the program 161. Depending on the instruction just executed updating the program counter may involve incrementing the address contained in the program counter or loading the program counter with a new address in order to achieve a branch operation.

Each step or sub-process in the processes of flow charts are associated with one or more segments of the program 161, and is performed by repeated execution of a fetch-execute cycle in the processor 150 or similar programmatic operation of other independent processor blocks in the camera system 100.

It would be desirable to select highlights on the camera 100 itself for several reasons. One reason is to simplify the video production process, in order to make it more likely that camera operators would use the feature. Furthermore, if the camera 100 is network connected the camera would also allow the selected highlights to be directly uploaded from the camera to Internet video sharing services. Video highlights are shorter than an original video, so will upload faster and consume less network bandwidth. Also additional metadata about the video sequence is easily accessible from software running on the camera itself.

One problem with selecting video highlights automatically on the camera 100, is that available processing power is typically severely limited. Available general purpose processing power and memory capacity are usually limited on a camera such as the camera 100, and the requirement to maximise battery life further limits the amount of processing that can be done on the camera 100. These limitations largely rule out video frame image processing techniques for highlight selection on cameras.

Highlight selection may be performed using only video metadata, which typically contains much less data than video frame data, so processing can be performed much more quickly and cheaply.

There are many methods for automatically selecting video. A fully fledged video selection system may use any number of such methods all of which may not be discussed below.

It is advantageous to determine sections of a video sequence when a camera operator is deliberately panning a camera (i.e., rotating the camera so as to bring a different part of the scene into view.

Camera pans may be divided into two distinct classes: smooth pans and snap pans. A smooth pan is where an operator rotates a camera at a slow or moderate rate, usually being careful to hold the camera steady. A smooth pan may be performed to track an important subject, or to display more of a scene than can fit in the field of view of the camera. Often a smooth pan will capture desirable footage, so smoothly panning footage should be selected for video highlights.

On the other hand, a snap pan is a rapid rotation of a camera to switch the camera to a new subject to take in a new part of a scene being captured. Typically the video sequences captured during a snap pan are undesirable and should not be selected for video highlights.

Thus, to be useful for video highlight selection, pans may be detected to categorise the pans as either a smooth pan or a snap pan. There are several existing methods for detecting camera pans. One known method is to utilise angular velocity data from a gyro sensor located in a camera. If the camera is moving at an angular velocity above a threshold, then the camera is deemed to be panning. The pan type may then be determined from the angular velocity. The method of detecting pans using angular velocity data from a gyro sensor located in a camera requires high quality data, and any drift in velocity data means pan starts and ends cannot be determined. Some low end gyro sensors instead output angular acceleration data that is noisy and exhibits drift. It is not possible to reliably integrate such noisy angular acceleration data to obtain accurate angular velocity data. Thus, the above described method of detecting pans using angular velocity data from a gyro sensor located in a camera is not applicable to some low end gyro sensors.

As discussed above, to automatically select highlight segments from a video sequence using software running on the camera 100, it is advantageous that the software only use the video metadata to make the highlight selection. Using image processing techniques on the video frame data requires too much processing power, which can lead to a shorter battery life.

Methods are described below to both detect camera pans (i.e., changes in angular position of a camera), and to classify the detected camera pans as either smooth pans or snap pans. The detection and classification of camera pans is done using gyro metadata and brightness data, where the gyro data may be from a low cost gyro sensor that may exhibit significant noise and drift. The camera pans may be classified based on acceleration metadata. The camera pans may also be classified based on velocity change.

Figure 2A:
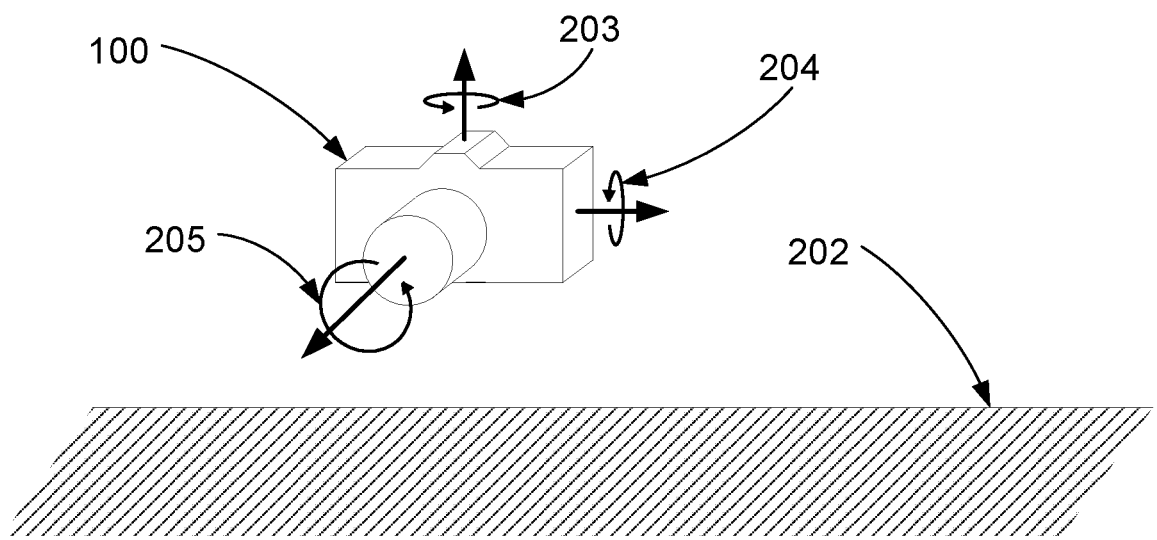
FIG. 2A is a diagram showing axes of rotation of a camera in one example.

FIG. 2A shows a diagram of the camera 100 above a horizon 202 according to one example. The three axes of rotation of the camera 100 are yaw axis 203, pitch axis 204 and roll axis 205. The orientation of the camera 100 shown in FIG. 2A is called 'landscape mode'. If the camera 100 is rotated ninety (90) degrees around the roll axis 205, then the orientation of the camera 100 will be 'portrait mode'.

In order to detect a change in angular position of the camera 100 in the example of FIG. 2A, first one of the two axis 203 and 204 is selected. If an orientation sensor is available, then the orientation of the camera 200 may be used to select an axis: if the orientation sensor indicates that the camera 100 is in landscape mode, then the yaw axis 203 is selected, otherwise if the camera 100 is in portrait mode then the pitch axis 204 is selected. If an orientation sensor is not available, then the camera 100 is assumed to always be in landscape mode, and the yaw axis 203 is always selected. Gyro frame data from the selected axis is then processed into a list of acceleration runs. The list of acceleration runs may be configured within the RAM 170. An acceleration run is a series of contiguous angular acceleration data points with the same acceleration sign (either positive, negative or zero). An acceleration run has a plurality of acceleration characteristics including a sign, a start time, a duration and a magnitude. The magnitude of an acceleration run is the change in angular velocity caused by the acceleration run. Velocity change may be determined by combining acceleration values associated with an acceleration run.

Figure 2B:
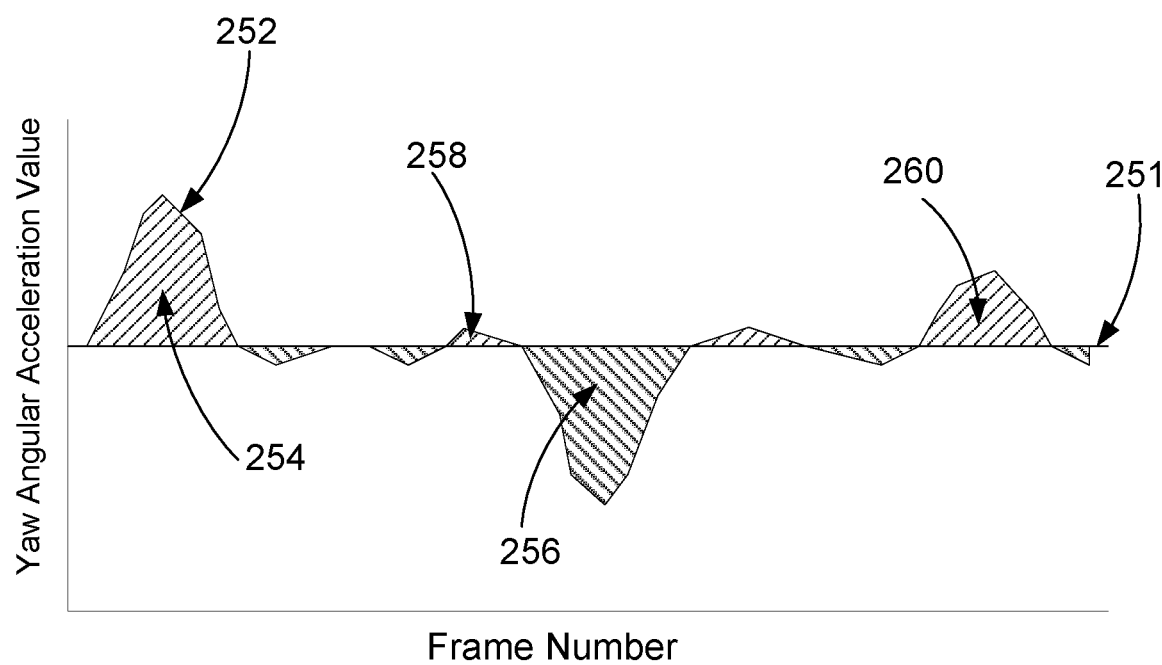
FIG. 2B is a diagram illustrating a plot of yaw angular acceleration data and a process of breaking the acceleration data into acceleration runs in the example of FIG. 2A.

FIG. 2B shows an example plot of yaw axis angular acceleration data for a contiguous set of frames captured by camera 100 in the example of FIG. 2A. Straight line 251 is the zero value. Curve 252 shows recorded yaw axis angular acceleration values from the gyro sensor. The curve 252 has been broken up into segments with the same sign—where the segments with the same sign represent acceleration runs. Some of the acceleration runs in the example of FIG. 2B have been labelled 254, 256, 258 and 260. The area enclosed by any one of the segments (shown hashed) 254, 256, 258 and 260 represents magnitude of the acceleration run corresponding to that segment. The curve 252 represents an acceleration profile for the contiguous set of frames.

Continuing the example of FIG. 2A, brightness data is then processed and change in brightness at every frame in the contiguous set of frames of the input video being captured by the camera 100 is determined. The change in brightness is determined by determining a change in brightness metadata in the contiguous set of frames.

An unprocessed acceleration run with the largest magnitude (e.g., acceleration run 256) is selected and a list containing the acceleration runs (e.g., 254, 256, 258 and 260), configured within RAM 170, is scanned backwards and forwards from the selected acceleration run looking for other acceleration runs with a similar magnitude and opposite sign. For each acceleration run so found, a candidate camera pan is determined, and a pan score and pan type of the candidate pan is determined using angular acceleration values from the gyro sensor and the change in brightness. The pan score may be referred to as an angular movement score and is used to select a best candidate pan and to confirm that the candidate pan is real. Another unprocessed acceleration run is then selected and the above process is repeated until all acceleration runs in the list of acceleration runs have been processed.

In the example shown in FIGS. 2A and 2B, the above process begins by selecting the acceleration run with the largest magnitude, which is acceleration run 256. Searching backwards and forwards for acceleration runs with a similar magnitude and opposite sign would locate acceleration runs 254 and 260. A candidate pan would be determined for the pair 252 and 256 and another candidate pan for the pair 256 and 260. Whichever of the two pans scored most highly would be the selected candidate pan.

The process described above with reference to FIGS. 2A and 2B repeats until all acceleration runs have been processed or marked as invalid. The end result is a list of confirmed camera pans, all of which are assigned a pan score and pan type. The list of confirmed camera pans is finally used to select or reject frames from the input video sequence.

Methods described with reference to FIGS. 2A to 8 make use of video metadata, and compared to other methods that use image processing of video frame data, require very little processing power from the camera processing unit 150. The metadata used by the methods of FIGS. 2A to 8 is comparatively much smaller than image data: a single frame of 1080p video data is around six (6) million bytes of data, while the metadata for that single frame will be less than one hundred (100) bytes. Furthermore, algorithms used to implement the methods described with reference to FIGS. 2A to 8 involve no heavy processing. The methods described with reference to FIGS. 2A to 8 are light-weight enough that it is practical to perform operations on the camera 100 itself without significantly reducing camera battery life (a critical resource on the camera 100). In contrast, image analysis of video frames by tracking pixel-based features in image data requires significant processing power, and is not suitable for software running on a CPU constrained camera. By allowing automatic video highlight selection on the camera 100 itself, a camera user is able to upload highlight video directly to online video sharing services, bypassing the need for a separate computer to perform such an upload operation.

Implementing the methods described with reference to FIGS. 2A to 8 on a camera should require no hardware changes to the camera. The metadata used in the described methods can be extracted from hardware that already exists on many cameras.

By combining gyro and brightness data, the methods described with reference to FIGS. 2A to 8 are able to compensate for noisy gyro data, as may be produced by low end gyro sensors, reducing production cost of a camera that implements the described methods.

Figure 3:
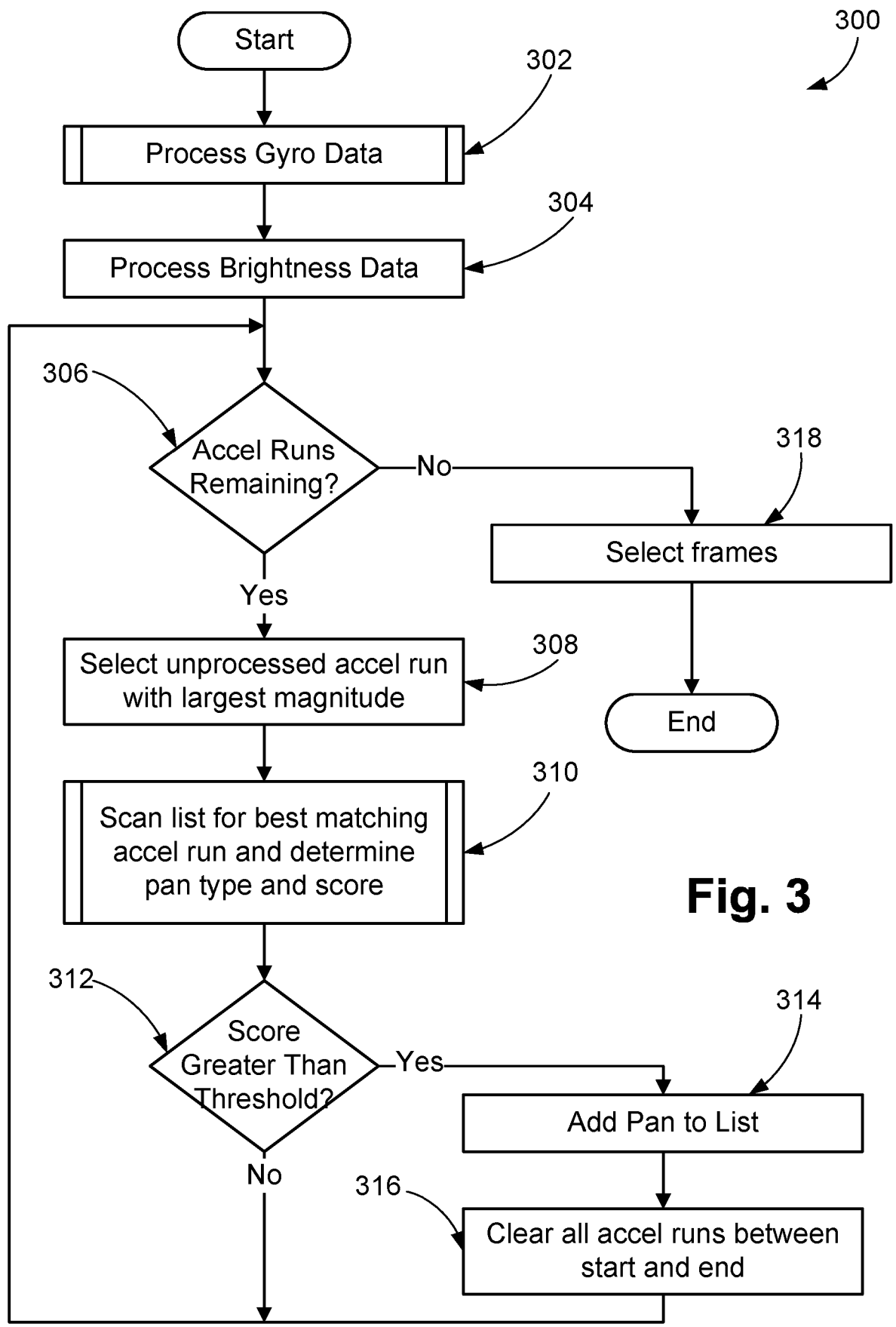
FIG. 3 is a schematic flow diagram showing a method of detecting pans.
Figure 4:
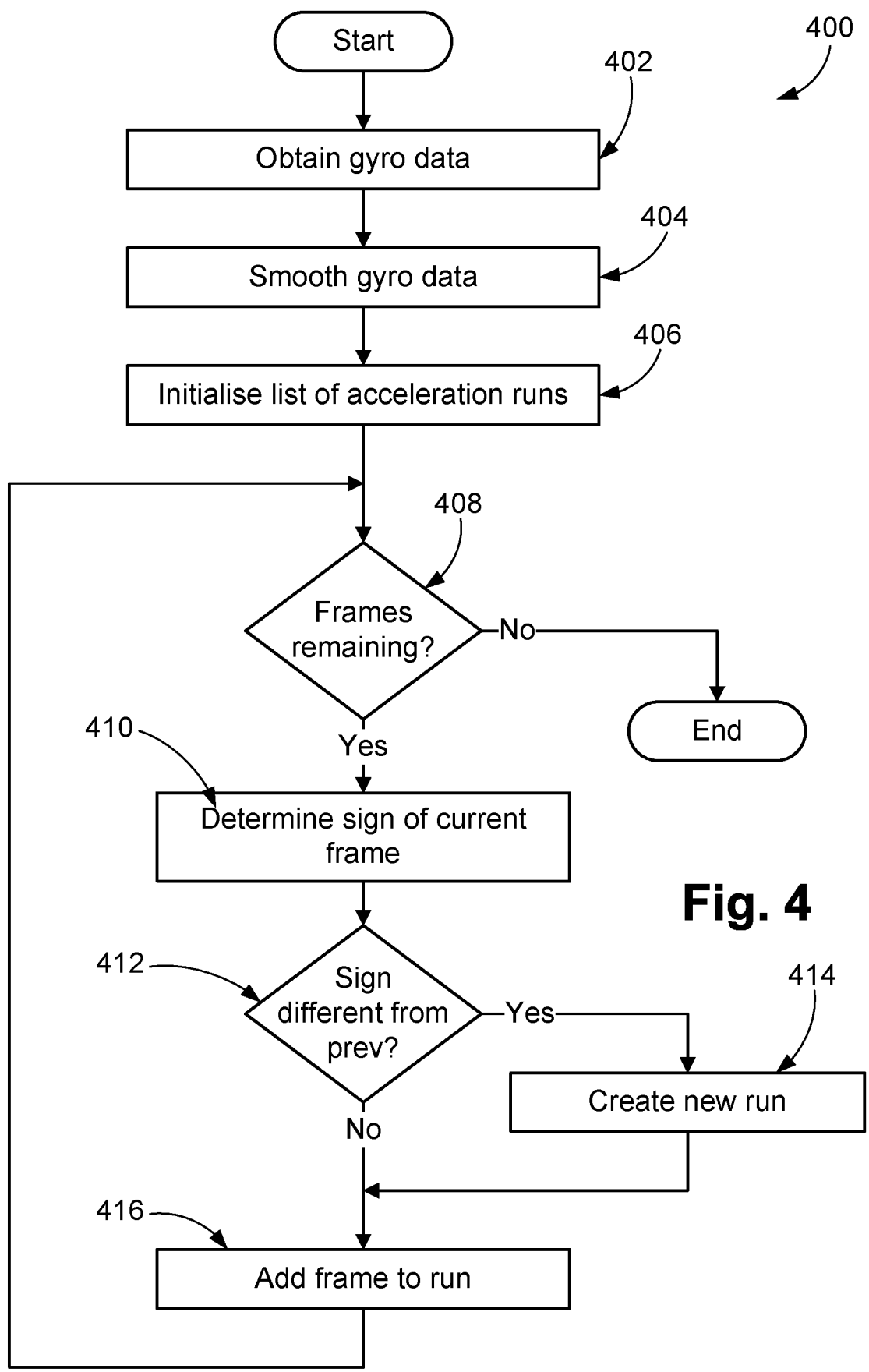
FIG. 4 is a schematic flow diagram showing a method of processing gyro metadata, as executed in the method of FIG. 3.

FIG. 3 is a schematic flow diagram showing a method 300 of detecting and classifying camera pans. The method 300 will be described by way of example with reference to the camera 100. As the camera 100 pans, an angular position of the camera 100 changes. The method 300 detects a change in angular position of the camera 100. As described in detail below, the change in the angular position of the camera or an angular movement type (or a pan type) is detected based on an angular movement score in the form of a pan score. The detected change in angular position or the angular movement type may be used to adjust a manner in which a plurality of frames captured by the camera 100 are subsequently displayed on the display device 123 coupled with the camera 100.

The method 300 may be implemented as one or more software code modules of the system program 161 resident in the ROM 160 and being controlled in its execution by the processor 150.

Input to the method 300 is the metadata for every frame in an input video sequence being captured by the camera 100. The method 300 may be executed after or during the camera 100 receiving a plurality of frames captured by the camera 100. The output of the method 300 is a list of all the video frames in the input video, some of which may have been marked as rejected, and some of which may have been marked as important.

The method 300 begins at gyro data processing step 302, where gyro metadata is processed to produce a list of acceleration runs within the RAM 170 under execution of the processor 150. A method 400 of processing gyro metadata, as executed at step 302, will be described below with reference to FIG. 4.

The method 300 then moves to brightness data processing step 304, where brightness metadata is processed to determine the brightness change for every frame in the input video sequence. The brightness change for the first frame is set to zero. For every other frame in the input video sequence, the change in brightness is determined by subtracting the brightness value of the previous frame from the brightness value of the current frame.

All acceleration runs in the list of acceleration runs produced in step 302 are then marked as unprocessed and valid, and the method 300 moves to decision step 306. At decision step 306, if there are any unprocessed and valid acceleration runs remaining in the list configured within the RAM 170, then the method 300 moves from step 306 to the step 308. Otherwise, if there are no remaining acceleration runs to be processed then the method 300 moves from step 306 to selecting step 318.

In selecting step 308, the list of acceleration runs configured within the RAM 170 is scanned to select an acceleration run based on the magnitude of each of the acceleration runs. The unprocessed and valid acceleration run with the largest magnitude is selected at step 308. In the example yaw acceleration data shown in FIG. 2B, the unprocessed and valid acceleration run located at step 308 would be the acceleration run 256. The located acceleration run is selected and marked as processed. The method 300 then moves to scanning step 310.

In scanning step 310, list of acceleration runs is scanned under execution of the processor 150. A matching acceleration run is determined at step 310 for the acceleration run selected at step 308 based on similarity of acceleration characteristics in the acceleration profile. Acceleration runs match if acceleration runs have opposite signs and similar velocity change. For each acceleration run whose magnitude is similar but opposite to the acceleration run selected at step 308, a candidate camera pan is determined. The candidate camera pan is a contiguous set of panning motion frames selecting from the plurality of frames captured by the camera 100. Each candidate camera pan is determined based on similarity of acceleration characteristics as described in more detail below. For each candidate pan, an angular movement score in the form of a pan score is determined. A pan type is also determined for the candidate pan. The pan score and pan type are determined using the change in brightness metadata and the angular acceleration values from the gyro sensor. The pan score is a number between zero (0) and ten (10) which represents the confidence that a candidate pan is an actual pan. The candidate pan with the largest pan score is selected at step 310. A method 500 of determining a candidate pan from a list of acceleration runs, as executed at step 310, will be described below with reference to FIG. 5.

The method 300 then moves to decision step 312. If a valid candidate pan was selected in previous step 310 and if the pan score of the candidate pan is greater than a threshold (e.g., a value of five out of a maximum pan score of ten is a reasonable choice for this threshold), then the method 300 moves from step 312 to adding step 314. Otherwise, the method 300 moves from step 312 back to the decision step 306.

In step 314, the candidate pan selected in step 314 is added to a list of confirmed pans configured within the RAM 170.

The method 300 then moves to clearing step 316, where all acceleration runs between (and including) the start and end acceleration runs in the confirmed pan are marked as invalid under execution of the processor 150. Step 316 is performed because camera pans do not interleave, so the confirmed pans must not be included in another pan. The method 300 then moves back to the decision step 306.

In selecting step 318, the list of detected camera pans (if any) configured within RAM 170 is used to select frames. The method of selecting frames at step 318 using the detected pans is application dependant. Frames corresponding to smooth panning motion may be selected for storing or displaying. In one example, for every snap pan in the list of camera pans, the frames in the input video sequence between the start and end of the snap pan are marked as rejected. For every smooth pan in the list of camera pans, the frames in the input video sequence between the start and end of the smooth pan are marked as important. Frames marked as important may be included in a highlight summary of the input video sequence.

The method 300 concludes following step 318. The result of the method 300 is a list of frames, some of which may have been marked as important, and some of which may have been marked as rejected.

Having described the processing of the method 300, the method 400 executed at step 302 and the method 400 executed at step 310 will now be described.

The method 400 executed at step 302 will be described by way of example with reference to the camera 100. The method 400 may be implemented as one or more software code modules of the system program 161 resident in the ROM 160 and being controlled in its execution by the processor 150. In the method 400, the gyro metadata is transformed to produce a list of acceleration runs.

The method 400 starts at data obtaining step 402, where gyro data from one of the two gyro axis 203 and 204 is obtained under execution of the processor 150. The orientation of the camera 100, as returned by the orientation sensor 200, is used to select which axis 203 and 204 will be used. If the orientation sensor 200 indicates that the camera 100 is in landscape mode then the yaw axis 203 is selected. Alternately, if the sensor 200 indicates that the camera 100 is in portrait mode then the pitch axis 204 is selected. The angular acceleration gyro data for the selected axis is then obtained under execution of the processor 150. The angular acceleration gyro data may be stored within the RAM 170.

The method 400 then moves to smoothing step 404, where a low pass filter operation is performed on the gyro axis data selected in step 402 to remove any high frequency components of the data signal. In one arrangement, the data signal may be smoothed using a weighted moving average. For example, for every frame, a weighted average is taken of all frames within n frames of the frame in question, where the contribution of a particular frame to the weighted average depends on the inverse of the distance of the frame from the current frame. A suitable value of n is one (1) second worth of frames.

The method 400 then moves to initialising step 406. In step 406, the list of acceleration runs configured within the RAM 170 is initialised to be empty, the previous acceleration sign is set to be invalid and the current frame is set to be the first frame.

The method 400 then moves to the decision step 408. If the current frame is valid (i.e. there are remaining frames), then the method 400 moves from step 408 to step 410. Otherwise, if the end of the list of acceleration runs configured within the RAM 170 has been reached, then the method 400 concludes.

In determining step 410, the sign of the gyro axis data for the current frame is determined under execution of the processor 150. If the angular acceleration value is larger than zero, then the sign is set to 'positive'. If the angular acceleration value is less than zero, then the sign is set to 'negative'. Otherwise, the sign is set to be 'zero'.

The method 400 then moves to decision step 412. In decision step 412, if the sign of the gyro axis data of the previous sign is invalid or if the sign of the gyro axis data for the current frame is different from the previous sign, then the method 400 moves from step 412 to determining step 414. Otherwise, if the sign of the gyro axis data for the current frame is the same as the previous sign, then the method 400 moves from step 412 to the adding step 416.

In creating step 414, a new acceleration run is created, under execution of the processor 150, and is added to the list of acceleration runs. The new acceleration run created at step 414 is set to be the current acceleration run. The sign of the new acceleration run is set to the sign of the current frame, the start time of the acceleration run is set to the time of the current frame and the duration and magnitude of the acceleration run are both set to zero.

In adding step 416, the current frame is added to the current acceleration run, under execution of the processor 150. The duration of the current acceleration run is incremented by the frame duration (i.e., the time intervals between frames). The acceleration magnitude is incremented by the absolute value of the angular acceleration value of the frame multiplied by the frame duration. The absolute value of the angular acceleration value of the frame multiplied by the frame duration is the absolute change in velocity implied by the acceleration of the current frame as compared to the previous frame. The current frame is then set to be the next frame and the method 400 returns to the decision step 408.

On conclusion of the method 400, the full list of acceleration runs has been collected.

Figure 5:
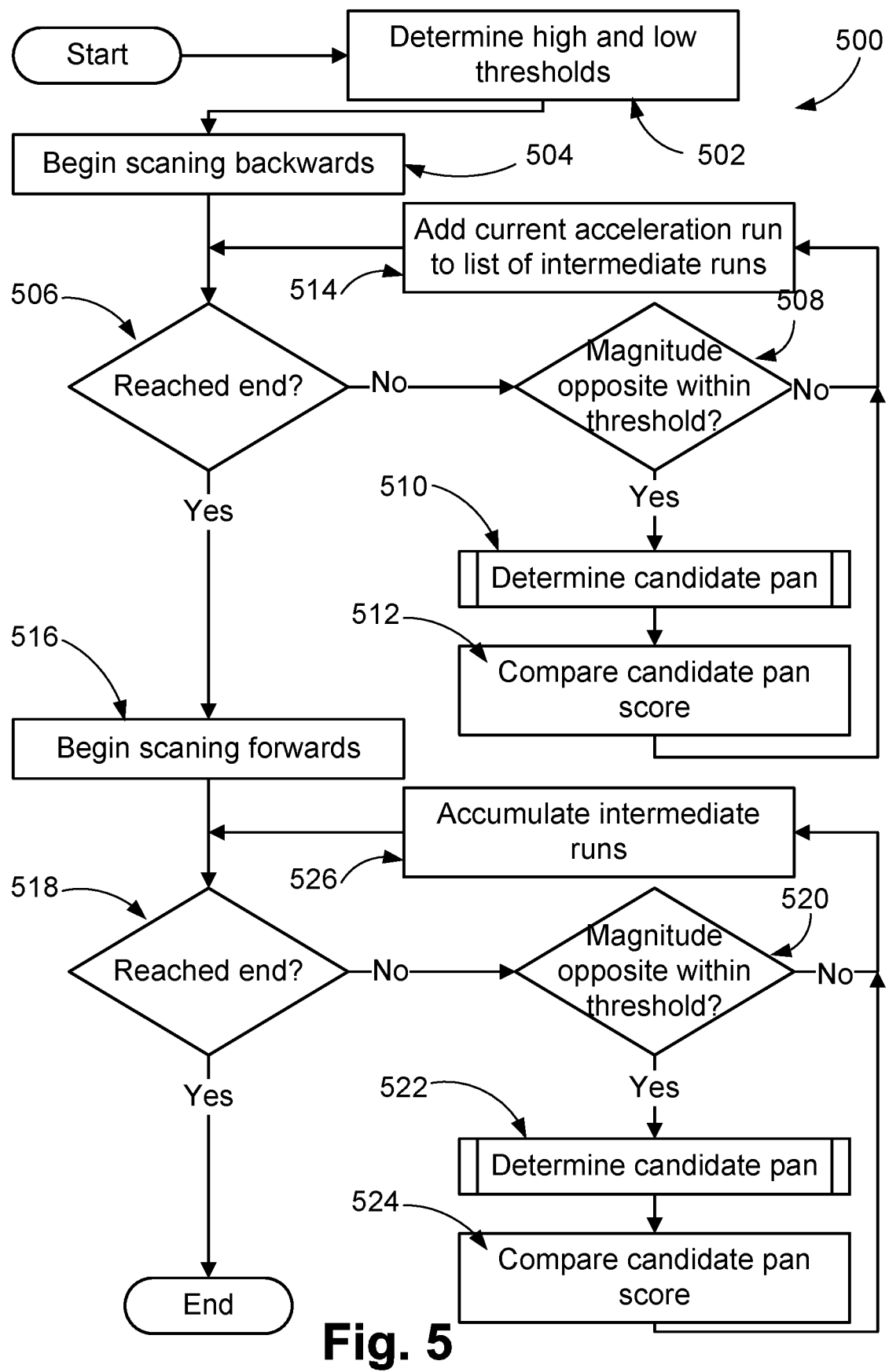
FIG. 5 is a schematic flow diagram showing a method of determining a candidate pan from a list of acceleration runs as executed in the method of FIG. 3.

The method 500 of determining a candidate pan from a list of acceleration runs, as executed at step 310, will be described below with reference to FIG. 5. The method 500 may be implemented as one or more software code modules of the system program 161 resident in the ROM 160 and being controlled in its execution by the processor 150. The input to the method 500 is the list of acceleration runs and an input selected acceleration run from the list. The output of the method 500 is zero or one candidate pans.

This method 500 will be described by way of example with reference to FIG. 2B. For the purpose of the example of FIG. 2B, the acceleration run list may be considered to contain entries for all of the segments shown as hashed in FIG. 2B. The list of acceleration runs will have nine elements, including the segments 254, 256, 258, 260 and the other five unmarked segments. The input selected acceleration run will be the acceleration run numbered 256.

The method 500 starts at determining step 502, where a low and a high threshold is determined under execution of the processor 150. The thresholds determined at step 502 may be stored in the RAM 170. The low threshold is half of the magnitude of the input selected acceleration run. The high threshold is twice the magnitude of the input selected acceleration run. As described below, the low and high thresholds are subsequently used to select acceleration runs that may be the matching end of a pan. A best candidate pan determined in the method 500 is set to be invalid. The best candidate pan may be subsequently used to store a current best candidate pan, so that newly determined pans can be compared against the best candidate pan.

The method 500 then moves to scanning step 504, where the processor 150 is configured to begin scanning backwards through the acceleration list. The acceleration list is scanned at step 504 from the selected acceleration run towards the start of the acceleration list. The current acceleration run is set to be the input acceleration run in the acceleration run list configured within the RAM 170. A list of intermediate runs configured within RAM 170 is set to be an empty list.

The method 500 then moves to the decision step 506. The current acceleration run is moved one place in the list of acceleration runs in the direction of the start of the list of acceleration runs. If the current acceleration run has passed the beginning of the list of acceleration runs, or if the new current acceleration run is marked as invalid, then the method 500 moves from step 506 to scanning step 516. Otherwise, the method 500 moves from step 506 to decision step 508.

At decision step 508, the similarity of the acceleration characteristics of the current acceleration run and the input acceleration run is determined by testing the sign of the current acceleration run and comparing the magnitude of the current acceleration run is against the low and high thresholds determined in step 502. If the sign of the current acceleration run is opposite to that of the selected input acceleration run; and if the acceleration magnitude is between the low and high thresholds, then the method 500 moves from step 508 to determining step 510. Otherwise, the method 500 moves from step 508 to the adding step 514.

In the example shown in FIG. 2B, scanning backwards from the input acceleration run 256 will locate the two acceleration runs marked 258 and 252 that have an opposite sign to the input selected acceleration run 256. The magnitude of the acceleration run 258 is outside the low and high thresholds (i.e. below the low threshold or above the high threshold). Only the acceleration run 252 has a magnitude within the thresholds, so only for that acceleration run will the process reach determining step 510.

In determining step 510, a new candidate pan is determined under execution of the processor 150. The new candidate pan begins with the current acceleration run, ends with the input selected acceleration run and has the current intermediate run list for the intermediate runs of the new candidate pan. The intermediate runs of a candidate pan is a list of acceleration runs between the start and end run of the pan. The intermediate runs are used to determine the pan score. A pan type and pan score is determined for the candidate pan. A method 600 of determining a candidate pan, as executed at step 510, will be described in detail below with reference to FIG. 6. Once step 510 is completed, the method 500 moves to step 512.

In comparing step 512 the pan score of the newly determined candidate pan is compared against the pan score of the best candidate pan if the best candidate pan is not invalid. If the pan score of the new candidate pan is greater than the pan score of the best candidate pan, or if the best candidate pan is invalid then any existing best candidate pan is discarded and the best candidate pan is set to the newly determined candidate pan. Otherwise the newly determined candidate pan is discarded. The method 500 then moves to the step 514.n adding step 514, the current acceleration run is added to the list of intermediate runs. The method 500 then moves back to the decision step 506.

In scanning step 516, the processor 150 is configured to begin scanning forwards through the acceleration list (i.e. from the selected acceleration run towards the end of the acceleration run list). The current acceleration run is set to be the input acceleration run in the acceleration run list. The list of intermediate runs configured within RAM 170 is set to be an empty list.

The method 500 then moves from step 516 to the decision step 518. The current acceleration run is moved one place in the list of acceleration runs configured within RAM 170 in the direction of the end of the list. If the current acceleration run has passed the end of the list, or if the new current acceleration run is marked as invalid, then the method 500 concludes. Otherwise the method 500 moves from step 518 to the decision step 520.

In the decision step 520, the similarity of the acceleration characteristics of the current acceleration run and the input acceleration run is determined by testing the sign of the current acceleration run and comparing the magnitude of the current acceleration run against the low and high thresholds determined in step 502. If the sign of the current acceleration run is opposite to that of the input selected acceleration run and if the acceleration magnitude is between the low and high thresholds then the method 500 moves from step 520 to determining step 522. Otherwise, the method 500 moves from step 520 to the adding step 526.

In determining step 522, a new candidate pan is determined. The new candidate pan begins with the input selected acceleration run, ends with the currently selected acceleration run and has the current intermediate run list for the intermediate runs of the new candidate pan. A pan type and pan score is determined for the candidate pan at step 522 in accordance with the method 600 Once step 522 is completed the method 500 moves to step 524.

In comparing step 524, the pan score of the newly determined candidate pan is compared against the pan score of the best candidate pan if the best candidate pan is not invalid. If the pan score of the new candidate pan is greater than the pan score of the best candidate pan, or if the best candidate pan is invalid, then any existing best candidate pan is discarded and the best candidate pan is set to the newly determined candidate pan. Otherwise, the newly determined candidate pan is discarded. The method 500 then moves to the step 526.

In step 526, the current acceleration run is added to the list of intermediate runs configured within RAM 170. The method 500 then moves back to the decision step 518 following step 526.

The result of the method 500 is the best candidate pan selected in step 512 or 524. The best candidate pan may be invalid if no acceleration run was found whose magnitude was between the low and high thresholds.

Figure 6:
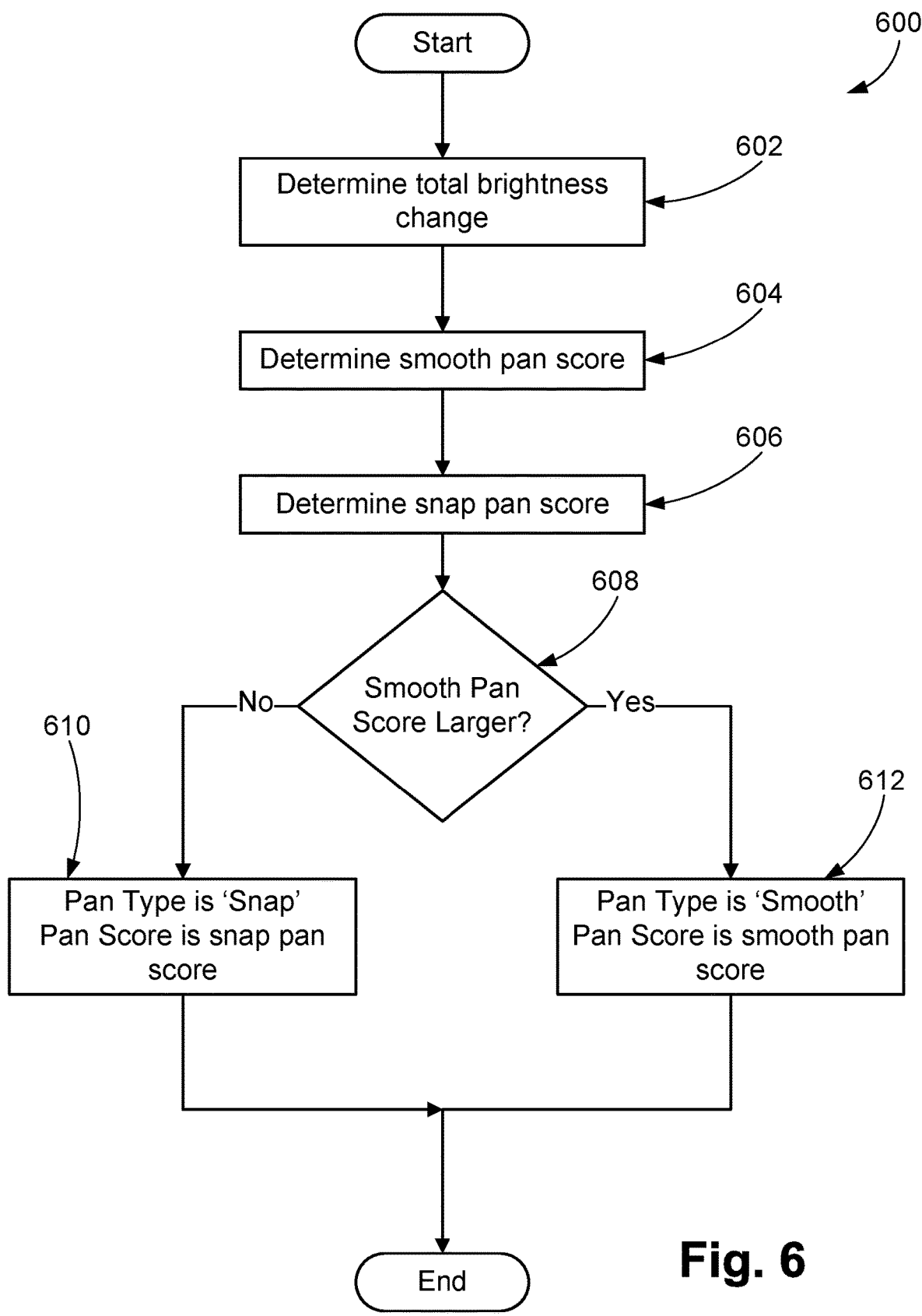
FIG. 6 is a schematic flow diagram showing a method of determining a candidate pan.

The method 600 of determining a candidate pan, as executed at steps 510 and 522, will now be described in detail below with reference to FIG. 6. The method 600 may be implemented as one or more software code modules of the system program 161 resident in the ROM 160 and being controlled in its execution by the processor 150. The method 600 determines a new candidate pan. The inputs to the method 600 include the acceleration run which is the start of the candidate pan, the acceleration run which is the end of the candidate pan and the list of intermediate acceleration runs (i.e., those acceleration runs which lie between the start and end of the pan). The method 600 is configured for classifying panning motion as a smooth pan based on acceleration data, as described below.

This method 600 starts at determining step 602, where, for every frame between the first frame of the start acceleration run and final frame of the end acceleration run, the absolute value of the brightness change of each frame (as determined in step 304) is added together. The result of step 602 is the total brightness change of the candidate pan. The total brightness change determined at step 602 may be stored in the RAM 170 under execution of the processor 150.

The method 600 then moves to determining step 604, where the smooth pan score for the candidate pan is determined under execution of the processor 150. The smooth pan score is a confidence value that the candidate pan is a smooth pan. The method used to determine the smooth pan score at step 604 uses known characteristics of a smooth pan. For example, a smooth pan has a relatively long duration. The smooth pan score may be determined using duration of candidate panning motion frames. As another example, outside of the start and stop acceleration periods, a smooth pan will have low intermediate change in velocity as the camera operator holds the camera 100 steady. Further, a smooth pan score may be determined using acceleration characteristics of candidate motion frames as a smooth pan will have start and stop acceleration periods with similar magnitudes. Thus, the smooth pan score may be determined based on similarities of acceleration characteristics at beginning and end of candidate panning motion frames. Finally, a smooth pan will usually show a significant change in brightness. The smooth pan score may be determined using brightness metadata.

Factors which depend on the details of hardware of the camera 100 are also used to determine the smooth pan score at step 604. The determination of the smooth pan score at step 604 will now be described by way of example where exact numbers given in the example have been experimentally determined and some of the numbers may need to be adjusted for different camera hardware. The smooth pan score determined at step 604 may be stored in the RAM 170 under execution of the processor 150.

To determine the smooth pan score, four factors are determined corresponding to the known characteristics of a smooth pan described above. The factors corresponding to the known characteristics of a smooth pan have been scaled to fall between 0.0 and 10.0. The smooth pan score is determined as follows:

A time factor which is 2.5 times the minimum of 4.0 and the total pan duration is determined in accordance with Equation (1), below:

$$\text{time} = 2.5 * \min(4.0, \text{pan duration in seconds}) \quad (1)$$

An average intermediate change in velocity (aicv) factor which is the inverse of the maximum of 0.1 and the sum of all magnitudes in the intermediate list divided by the pan duration in seconds is determined in accordance with Equation (2), below:

$$\text{aicv} = 1.0/\max(0.1, (\text{total intermediate magnitude/pan duration in seconds})) \quad (2)$$

A symmetric factor which is the minimum of 10.0 and the maximum of the start and end magnitudes divided by the absolute value of the start magnitude minus the end magnitude, is determined in accordance with Equation (3), below:

$$\text{symmetric} = \min(10.0, \max(\text{start mag}, \text{end mag})/\text{abs}(\text{start mag} - \text{end mag})) \quad (3)$$

A brightness total factor which is 10 multiplied by the minimum of the total brightness change and 1.0, is determined in accordance with Equation (4), below:

$$\text{brightness total} = 10.0 * \min(\text{total brightness change in}, 1.0) \quad (4)$$

The smooth pan score may then be determined by combining the above four factors in accordance with Equation (5), as follows:

$$\text{smooth pan score} = (\text{time} + \text{aicv} + \text{symmetric} + 2.0 * \text{brightness total})/5.0 \quad (5)$$

The smooth pan score determined at step 604 is a number between 0 and 10.0.

Once the smooth pan score has been determined, the method 600 moves to determining step 606 where a snap pan score is determined. The snap pan score determined at step 606 may be stored in the RAM 170 under execution of the processor 170.

As for the smooth pan score, the snap pan score is a confidence value that the candidate pan is a snap pan. Again the method used to determine the snap pan score at step 606 uses known characteristics of a snap pan. For example, the snap pan score may be determined using duration of candidate panning motion frames as a snap pan is of a relatively short duration. Further, the snap pan score may be determined using acceleration characteristics of the candidate panning motion frames as a snap pan will have high peak accelerations in the start and stop acceleration periods. Panning motion may be classified as a snap pan based on acceleration peak magnitude. The snap pan score may be determined using peak acceleration magnitude of candidate panning motion frames.

The snap pan score may be also be determined at step 606 using similarities of acceleration characteristics at beginning and end of candidate panning motion frames since as with a smooth pan, a snap pan will have start and stop acceleration periods with similar magnitudes. Still further, the snap pan score may be determined using brightness metadata as a snap pan will usually show a significant change in brightness.

The determination of the snap pan score at step 606 will now be described by way of example. Again, exact numbers given in the example have been experimentally determined and some of the numbers may need to be adjusted for different camera hardware. The snap pan score is determined in a similar way to the smooth pan score. Four factors corresponding to the above snap pan characteristics are determined, each of which is a number between 0 and 10.0. The determination of two of the four factors corresponding to the above snap pan characteristics, is the same as the factors used to determine the smooth pan score.

An inverse time factor which is ten (10) divided by the maximum of 1.0 and the total pan duration, may be determined in accordance with Equation (6), as follows:

$$\text{inverse time} = 10.0/\max(1.0, \text{pan duration in seconds}) \quad (6)$$

A peak acceleration factor which is 2.0 times the minimum of 5.0 and the peak acceleration in the start and stop acceleration runs, is determined in accordance with Equation (7), below.

$$\text{peak accel} = 2.0 * \min(5.0, \text{peak acceleration in start and stop runs}) \quad (7)$$

The same symmetric factor determined in accordance with Equation (3) is used as for the smooth pan factor.

The same brightness total factor determined in accordance with Equation (4) is used as for the smooth pan factor.

The snap pan score may then be determined by combining the above four factors in accordance with Equation (8), as follows:

$$\text{snap pan score} = (\text{inverse time} + \text{peak accel} + \text{symmetric} + 2.0 * \text{brightness total})/5.0 \quad (8)$$

The snap pan score determined at step 606 is a number between 0.0 and 10.0.

The method 600 then moves to the decision step 608 for comparing the smooth pan score and the snap pan score. If the smooth pan score determined in step 604 is greater than the snap pan score determined in step 606, then the method

600 moves from step 608 to pan type step 612. Otherwise the method 600 moves from step 608 to pan type step 610.

Alternatively, the pan type may be determined in the method 600 using the camera field of view, in addition to brightness metadata and acceleration metadata, to adjust the smooth pan score and the snap pan score when comparing the smooth pan score and the snap pan score at step 608. The camera field of view may be determined from the camera focal length metadata. When the camera field of view is narrow compared to a standard camera field of view (i.e. the camera is zoomed in on a subject), where the standard camera field of view may be a field of view of 50 degrees, then a pleasing smooth pan is difficult to obtain because the effect of camera movement and camera shake is magnified. Similarly, when the camera field of view is wide (i.e. the camera is zoomed out) then a pleasing smooth pan is easier to obtain. The smooth and snap pan scores determined at steps 604 and 606, respectively, are for a standard camera field of view (e.g., a field of view of 50 degrees). If the camera field of view is wider than 50 degrees, then more pans are categorised as smooth pans (e.g., by increasing the smooth pan score and decreasing the snap pan score). If, on the other hand, the field of view is narrower than 50 degrees, then more pans are categorised as snap pans (e.g., by lowering the smooth pan score and raising the snap pan score). The pan scores may be determined (i.e. either increased or decreased), for example, based on a ratio of the current field of view and the standard field of view.

In one arrangement, the angular field of view of the camera (in degrees) is determined at step 608 using the camera focal length metadata in accordance with Equation (9), as follows:

$$afov = 2*a\ \tan(\text{camera sensor size}/(2*\text{camera focal length})) \quad (9)$$

Adjusted smooth and snap scores are then determined at step 608 in accordance with Equations (10) and (11), as follows:

$$\text{adjusted smooth pan score} = \text{smooth pan score}*(afov/50.0) \quad (10)$$

$$\text{adjusted snap pan score} = \text{snap pan score}/(afov/50.0) \quad (11)$$

In one arrangement, the adjusted smooth pan score is linearly proportional to the angular field of view normalised relative to the standard field of view (e.g., a standard field of view of 50 degrees), as per Equation (10). On the other hand, adjustment of the snap pan score is inversely proportional to the angular field of view normalised relative to the standard field of view (e.g., a standard field of view of 50 degrees), as per Equation (11). As such, if the field of view is wide (e.g., the angular field of view as per Equation (9) is above a predetermined threshold of 50 degrees), then the smooth pan score is increased based on the angular field of view while the snap pan score is decreased based on the angular field of view. Otherwise, if the field of view is narrow (e.g., the angular field of view as per Equation (9) is below the predetermined threshold of 50 degrees), then the smooth pan score is decreased based on the angular field of view while the snap pan score is increased based on the angular field of view. The pan score or an angular movement score for the panning motion frames may be effectively determined based on brightness metadata and a camera focal length associated with the candidate panning motion frames since the angular field of view is derived from the camera focal length.

The adjusted smooth pan score and adjusted snap pan score determined in accordance with Equations (10) and (11) may be compared at step 608. If the adjusted smooth pan score determined in accordance with Equation (10) is determined at step 608 to be greater than the adjusted snap pan score, then the method 600 moves from step 608 to pan type step 612. Otherwise, the method 600 moves from step 608 to pan type step 610. Thus, since the angular field of view is derived from the camera focal length, the pan type may be effectively determined by adjusting the smooth and snap pan scores based on the camera focal length associated with the panning motion frames.

In step 610, the pan type of the candidate pan is set to 'Snap' and the pan score of the candidate pan is set to the snap pan score determined in step 606. The method 600 then concludes following step 610.

In step 612, the pan type of the candidate pan is set to 'Smooth' and the pan score of the candidate pan is set to the smooth pan score determined in step 604. The method 600 then concludes following step 612.

The result of the method 600 is the pan type and pan score of the candidate pan determined in steps 610 or 612. The pan score may be used to select the best pan out of several candidate pans, and the pan type may be used to accept or reject video frames.

Figure 7:
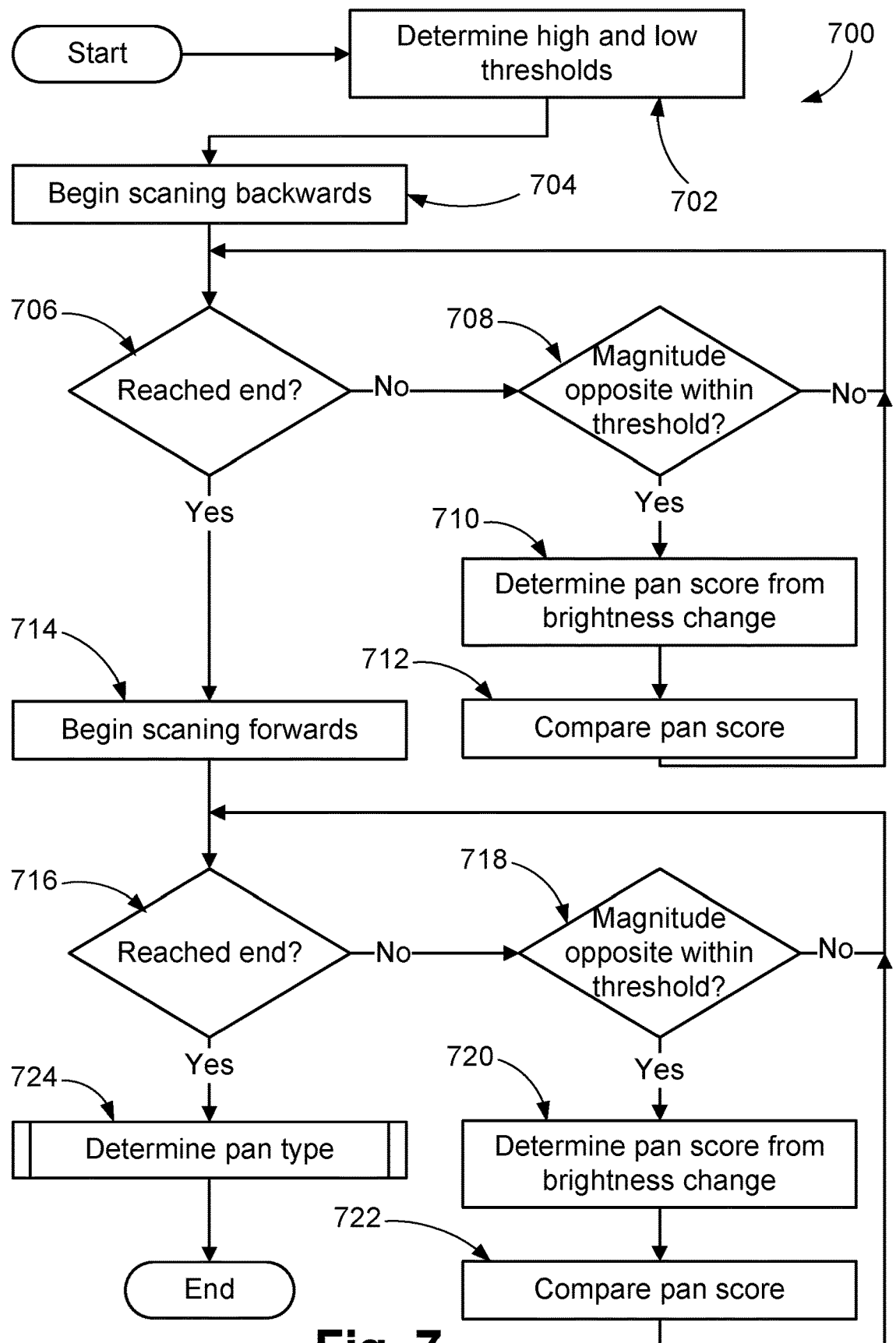
FIG. 7 is a schematic flow diagram showing a method of determining a candidate pan from a list of acceleration runs.

A method 700 of determining a candidate pan, which may be executed at step 310, will be described below with reference to FIG. 7. The method 700 uses a simpler method of determining the pan type and pan score of a candidate pan than the method 500, and requires less internal state. The method 700 is appropriate where high accuracy is not required, such as low end video cameras with very low quality gyro sensors or with very tight processing requirements. The method 700 may be implemented as one or more software code modules of the system program 161 resident in the ROM 160 and being controlled in its execution by the processor 150. Many parts of the method 700 are the same as for the method 500, and will not be described here. The description below will focus on differences between the method 700 and the method 500.

The method 700 provides an alternate process for step 310. The input to the method 700 is the list of acceleration runs and a selected acceleration run from the list. The output of the method 700 is zero or one candidate pans.

The method 700 starts at determining step 702, where a low and a high threshold is determined under execution of the processor 150. The thresholds determined at step 702 may be stored in the RAM 170. The low threshold is half of the magnitude of the input selected acceleration run. The high threshold is twice the magnitude of the input selected acceleration run. The current candidate pan is set to be invalid.

The method 700 then moves to scanning step 704 where the processor 150 is configured to begin scanning backwards through the acceleration list. The current acceleration run is set to be the input acceleration run in the acceleration run list configured within the RAM 170.

The method 700 then moves to the decision step 706. The current acceleration run is moved one place in the list of acceleration runs in the direction of the start of the list of acceleration runs. If the current acceleration run has passed the beginning of the list of acceleration runs, or if the new current acceleration run is marked as invalid, then the method 700 moves from step 706 to the scanning step 714. Otherwise, the method 700 moves from step 706 to decision step 708.

At decision step 708, the sign of the current acceleration run is tested and the magnitude of the current acceleration run is compared against the low and high thresholds determined in step 702. If the sign of the current acceleration run is opposite to that of the input selected acceleration run and if the acceleration magnitude is between the low and high thresholds then the method 700 moves from step 708 to determining step 710. Otherwise the method 700 moves from step 708 back to the decision step 706.

In determining step 710, the pan score is determined from the brightness data. For every frame between the first frame of the start acceleration run and the final frame of the end acceleration run, the absolute value of the brightness change of all frames (as determined in step 304) are added together, resulting in the total brightness change. The pan score is then set to ten (10) times the minimum of the total brightness change and 1.0, in accordance with Equation (9), as follows:

$$\text{pan score}=10.0*\min(\text{total brightness change},1.0) \quad (12)$$

In step 712, the pan score determined in step 710 is compared against the pan score of the current candidate pan if the current candidate pan is not invalid. If the pan score determined in step 710 is greater than the pan score of the current candidate pan, or if the current candidate pan is invalid then the existing current candidate pan is discarded and a new current candidate pan is determined. The new current candidate pan is determined with the start acceleration run set to be the current acceleration run, the end acceleration run set to be the input acceleration run and the pan score set to be the pan score determined in step 710. The method 700 then returns to the decision step 706.

In scanning step 714, the processor 150 is configured to begin scanning forwards through the acceleration list. The current acceleration run is set to be the input acceleration run in the acceleration run list configured within the RAM 170. The list of intermediate runs configured within RAM 170 is set to be an empty list.

The method 700 then moves from step 714 to the decision step 716. The current acceleration run is moved one place in the list of acceleration runs configured within RAM 170 in the direction of the end of the list. If the current acceleration run has passed the end of the list, or if the new current acceleration run is marked as invalid, then the method 700 moves from step 716 to determining step 724. Otherwise the method 700 moves from step 716 to the decision step 718.

In the decision step 718, the sign of the current acceleration run is tested and the magnitude of the current acceleration run is compared against the low and high thresholds determined in step 702. If the sign of the current acceleration run is opposite to that of the input selected acceleration run and if the acceleration magnitude is between the low and high thresholds then the method 700 moves from step 718 to determining step 720. Otherwise the method 700 moves from step 718 back to the decision step 716.

In step 720, the pan score is determined from the brightness data. For every frame between the first frame of the start acceleration run and the final frame of the end acceleration run, the absolute value of the brightness change of all frames (i.e., as determined in step 304) are added together. The result of step 720 is the total brightness change. The pan score is then set to ten (10) times the minimum of the total brightness change and 1.0 in accordance with Equation (10), as follows.

$$\text{pan score}=10.0*\min(\text{total brightness change},1.0) \quad (13)$$

In comparing step 722, the pan score determined in step 720 is compared against the pan score of the current candidate pan if the current candidate pan is not invalid. If the pan score determined in step 720 is greater than the pan score of the current candidate pan, or if the current candidate pan is invalid then the existing current candidate pan is discarded and a new current candidate pan is determined. The new current candidate pan is determined with the start acceleration run set to be the current acceleration run, the end acceleration run set to be the input acceleration run and the pan score set to be the pan score determined in step 720. The method 700 then moves from step 722 back to the decision step 716.

In determining step 724, the pan type is determined under execution of the processor 150. A method 800 of determining the pan type of a candidate pan, as executed at step 724, will be described below with reference to FIG. 8.

The result of the method 800 is one of the candidate pans determined in step 712 or 722 or an invalid candidate pan if no acceleration run was found whose magnitude was between the low and high thresholds.

Figure 8:
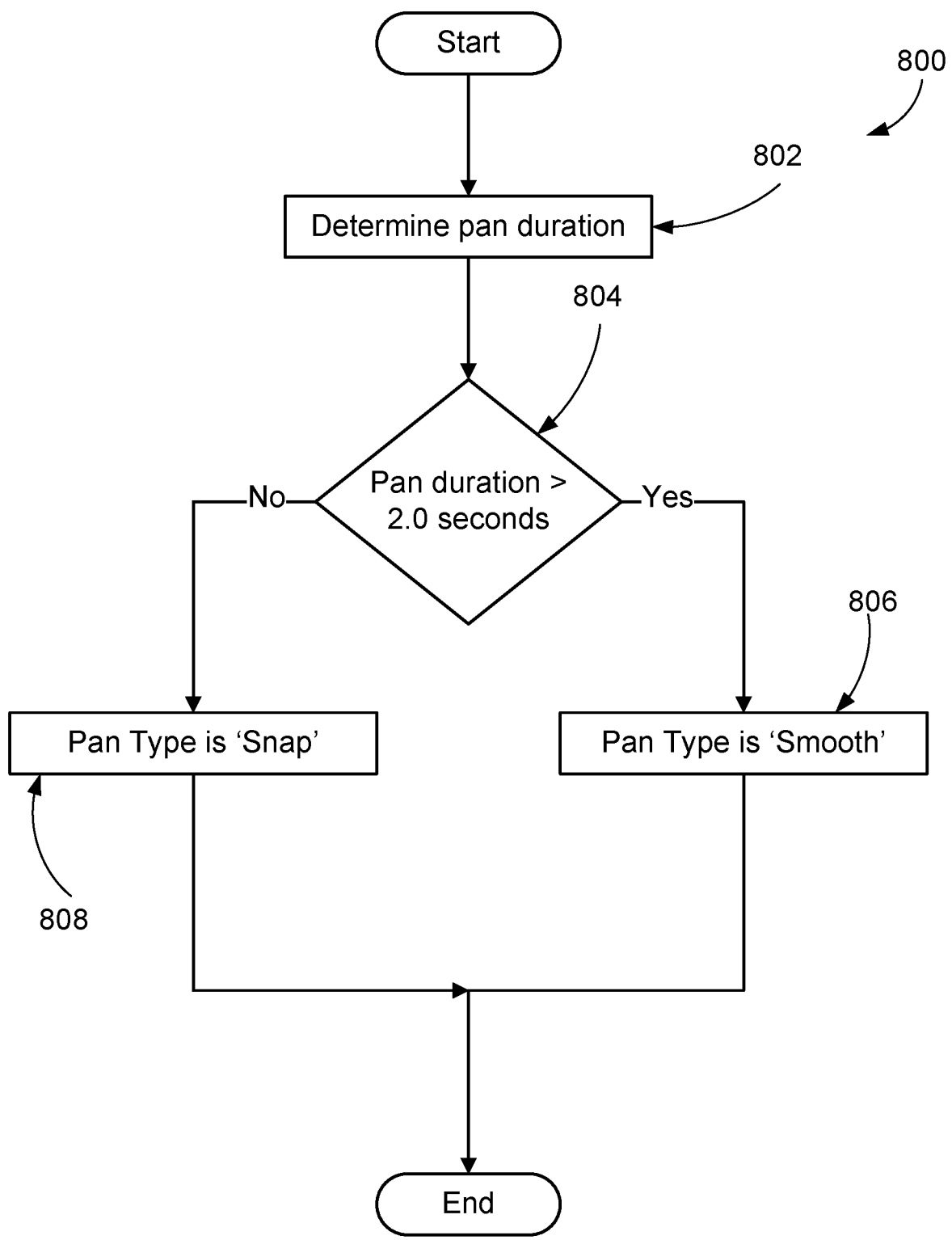
FIG. 8 is a schematic flow diagram showing a method of determining the pan type of a candidate pan.

The method 800 of determining the pan type of a candidate pan, as executed at step 724, will be described below with reference to FIG. 8. The method 800 may be implemented as one or more software code modules of the system program 161 resident in the ROM 160 and being controlled in its execution by the processor 150.

The method 800 starts at determining step 802, where the pan duration is determined under execution of the processor 150. The pan duration is the time interval from the first frame of the start acceleration run of the pan to the last frame of the end acceleration run. The determined pan duration may be stored in the RAM 170 under execution of the processor 150.

The method 800 then moves to the decision step 804 where the pan duration is tested. If the pan duration is greater than 2.0 seconds then the method 800 moves from step 804 to pan type step 806. Otherwise the method 800 moves from step 804 to pan type step 808.

In step 806 the pan type is set to 'smooth'. The method 800 then concludes.

In step 808 the pan type is set to 'snap'. The method 800 then concludes.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of detecting a change in angular position of a camera, the method comprising:
   receiving a plurality of frames captured by the camera, each frame being associated with brightness and acceleration metadata, the brightness metadata associated with a frame being representative of brightness of a scene captured by the frame;
   selecting a contiguous set of candidate panning motion frames from the plurality of frames, based on similarity of acceleration characteristics, to determine a change of brightness metadata in the selected contiguous set of frames;
   determining an angular movement score for the selected contiguous set of frames using the change of brightness metadata; and detecting a change in the angular position of the camera based on the angular movement score to adjust a manner in which the plurality of frames is displayed by a display device coupled with the camera, wherein the determining includes classifying panning motion associated with the selected contiguous set of frames as either a smooth pan or a snap pan based on the acceleration metadata and the change of brightness metadata, and frames in the snap pan are adjusted not to be selected for display as video highlights.

2. The method according to claim 1, further comprising:
determining an acceleration profile using acceleration metadata for the plurality of frames;
selecting an acceleration run from the determined profile, the acceleration run having a plurality of acceleration characteristics;
determining a matching acceleration run for the selected acceleration run based on similarity of acceleration characteristics in the acceleration profile, wherein the acceleration runs match if acceleration runs have opposite signs and similar velocity change.

3. The method according to claim 2, further comprising combining acceleration values associated with the acceleration run.

4. The method according to claim 2, further comprising determining, in the acceleration profile, a series of contiguous acceleration values having the same acceleration sign to select the acceleration run.

5. The method according to claim 1, further comprising classifying panning motion as a smooth pan based on acceleration metadata associated with the selected contiguous set of frames.

6. The method according to claim 1, further comprising classifying panning motion as a smooth pan based on velocity change determined based on the acceleration metadata.

7. The method according to claim 1, further comprising selecting frames corresponding to smooth panning motion for storing or displaying.

8. The method according to claim 1, further comprising classifying panning motion as a snap pan based on a peak acceleration magnitude of candidate panning motion frames.

9. The method according to claim 1, further comprising comparing a smooth pan score and a snap pan score.

10. The method according to claim 1, further comprising determining a pan score using the duration of candidate panning motion frames.

11. The method according to claim 1, further comprising determining a pan score using acceleration characteristics of candidate panning motion frames.

12. The method according to claim 1, further comprising determining a pan based on similarities of acceleration characteristics at beginning and end of candidate panning motion frames.

13. The method according to claim 1, further comprising determining a snap pan score using peak acceleration magnitude of candidate panning motion frames.

14. The method according to claim 1, further comprising determining a snap pan score using a change of brightness metadata.

15. The method according to claim 1, wherein the angular movement score is determined based on a camera focal length associated with the candidate panning motion frames.

16. A non-transitory system for detecting a change in angular position of the camera, the system comprising:

a memory for storing data and a computer program;
a processor coupled to the memory for executing the computer program, the computer program comprising instructions for:
receiving a plurality of frames captured by the camera, each frame being associated with brightness and acceleration metadata, the brightness metadata associated with a frame being representative of brightness of a scene captured by the frame;
selecting a contiguous set of candidate panning motion frames from the plurality of frames, based on similarity of acceleration characteristics, to determine a change of brightness metadata in the selected contiguous set of frames;
determining an angular movement score for the selected contiguous set of frames using the change of brightness metadata; and
detecting a change in the angular position of the camera based on the angular movement score to adjust a manner in which the plurality of frames is displayed by a display device coupled with the camera,
wherein the determining includes classifying panning motion associated with the selected contiguous set of frames as either a smooth pan or a snap pan based on the acceleration metadata and the change of brightness metadata, and frames in the snap pan are adjusted not to be selected for display as video highlights.

17. An apparatus for detecting a change in angular position of a camera, the apparatus comprising:
one or more processors; and
a memory in communication with the one or more processors, the memory having stored thereon instructions which, when executed by the one or more processors, cause the apparatus to:
receive a plurality of frames captured by the camera, each frame being associated with brightness and acceleration metadata, the brightness metadata associated with a frame being representative of brightness of a scene captured by the frame;
select a contiguous set of candidate panning motion frames from the plurality of frames, based on similarity of acceleration characteristics, to determine a change of brightness metadata in the selected contiguous set of frames;
determine an angular movement score for the selected contiguous set of frames using the change of brightness metadata; and
detect a change in the angular position of the camera based on the angular movement score to adjust a manner in which the plurality of frames is displayed by a display device coupled with the camera,
wherein the determining includes classifying panning motion associated with the selected contiguous set of frames as either a smooth pan or a snap pan based on the acceleration metadata and the change of brightness metadata, and frames in the snap pan are adjusted not to be selected for display as video highlights.

18. A non-transitory computer readable medium having a computer program stored thereon for detecting a change in angular position of a camera, the program comprising:
code for receiving a plurality of frames captured by the camera, each frame being associated with brightness and acceleration metadata, the brightness metadata associated with a frame being representative of brightness of a scene captured by the frame;
code for selecting a contiguous set of candidate panning motion frames from the plurality of frames, based on similarity of acceleration characteristics, to determine a change of brightness metadata in the selected contiguous set of frames;

code for determining an angular movement score for the selected contiguous set of frames using the change of brightness metadata; and code for detecting a change in the angular position of the camera based on the angular movement score to adjust a manner in which the plurality of frames is displayed by a display device coupled with the camera, wherein the determining includes classifying panning motion associated with the selected contiguous set of frames as either a smooth pan or a snap pan based on the acceleration metadata and the change of brightness metadata, and frames in the snap pan are adjusted not to be selected for display as video highlights.

19. A non-transitory system configured within a camera for detecting a change in angular position of the camera, the system comprising:

a memory for storing data and a computer program;

a processor coupled to the memory for executing the computer program, the computer program comprising instructions for:

receiving a plurality of frames captured by the camera, each frame being associated with brightness and acceleration metadata, the brightness metadata associated with a frame being representative of brightness of a scene captured by the frame;

selecting a contiguous set of candidate panning motion frames from the plurality of frames, based on similarity of acceleration characteristics, to determine a change of brightness metadata in the selected contiguous set of frames;

determining an angular movement score for the selected contiguous set of frames using the change of brightness metadata; and detecting a change in the angular position of the camera based on the angular movement score to adjust a manner in which the plurality of frames is displayed by a display device coupled with the camera, wherein the determining includes classifying panning motion associated with the selected contiguous set of frames as either a smooth pan or a snap pan based on the acceleration metadata and the change of brightness metadata, and frames in the snap pan are adjusted not to be selected for display as video highlights.

20. A camera comprising:

a memory for storing data and a non-transitory computer program;

a processor coupled to the memory for executing the computer program, the computer program comprising instructions for:

receiving a plurality of frames captured by the camera, each frame being associated with brightness and acceleration metadata, the brightness metadata associated with a frame being representative of brightness of a scene captured by the frame;

selecting a contiguous set of candidate panning motion frames from the plurality of frames, based on similarity of acceleration characteristics, to determine a change of brightness metadata in the selected contiguous set of frames;

determining an angular movement score for the selected contiguous set of frames using the change of brightness metadata; and detecting a change in the angular position of the camera based on the angular movement score to adjust a manner in which the plurality of frames is displayed by a display device coupled with the camera, wherein the determining includes classifying panning motion associated with the selected contiguous set of frames as either a smooth pan or a snap pan based on the acceleration metadata and the change of brightness metadata, and frames in the snap pan are adjusted not to be selected for display as video highlights.

* * * * *